July 27, 1965 O. MÜLLER 3,197,689

CIRCUIT FOR DELAYED TRANSMISSION OF BINARY CODED INTELLIGENCE

Filed Aug. 25, 1961 2 Sheets-Sheet 1

INVENTOR
Otto Müller

BY George H. Spencer
ATTORNEY

INVENTOR
Otto Müller

BY George H. Spencer
ATTORNEY

United States Patent Office 3,197,689
Patented July 27, 1965

3,197,689

CIRCUIT FOR DELAYED TRANSMISSION OF BINARY CODED INTELLIGENCE

Otto Müller, Sulzbach (Murr), Wurttemberg, Germany, assignor to Telefunken Patentverwertungs-G.m.b.H., Ulm (Danube), Germany Filed Aug. 25, 1961, Ser. No. 133,871
Claims priority, application Germany, Sept. 3, 1960, T 18,954
4 Claims. (Cl. 320—1)

The present invention relates to a circuit arrangement for the delayed transmission of binary coded intelligence by changing the charge on a capacitor, wherein the change of charge of the capacitor is dependent on a clock pulse.

Delay lines of the above type are often used, particularly in arithmetic devices of electrical computers, for the transfer and logical interconnection of binary coded intelligence. The capacitor is charged by the output of the logical circuit and is interrogated by the subequent clock pulse. In this way, the contents of a memory element, into which the result of the logical circuit is to be stored later, can already be used for the logical interconnection.

There exist circuits which bring about such delay by means of resistor-capacitor combinations, but such arrangements cause the signal to be damped so that the size of the logical circuitry on the one hand, and the input sensitivity of the memory element on the other, must, for any given charging time, be kept within very narrow limits. Other known circuits effect the delay of the intermediate storage in their own amplifier stage between whose input electrode and ground there is a capacitor which is charged by the output of the logical circuit.

The present invention overcomes the above-mentioned drawbacks of the first-mentioned circuit and the additional stage which is required for the second, by a simple passive circuit which incorporates but few circuit elements, and to whose input any desired number of diode-logical circuit elements may be connected. In theory, there is no limit to the number of such logical circuits which may be connected to the input, the actual limit being imposed only by the effect of the reverse current. Basically, the present invention resides in a delay line between whose input and output there is a series circuit composed of a delay capacitor and a first diode (the term "diode," as used throughout the instant specification and claims, being deemed to include any rectifier element), wherein a clock pulse is applied to the input via a second diode. The center tap of the series circuit is connected, via a third diode, to a fixed voltage so that an input voltage will cause the delay capacitor to be charged by the fixed voltage during the clock pulse interval whereas the trailing flank of the clock pulse discharges the capacitor via the output circuit.

Additional objects and advantages of the present invention will become apparent upon consideration of the following description when taken in conjunction with the accompanying drawings in which.

Figure 1:
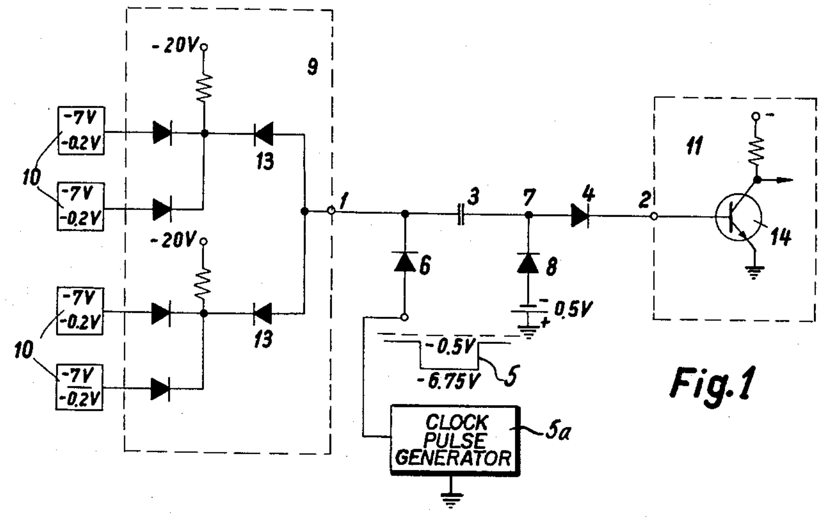
FIGURE 1 is a delay line circuit according to the present invention.

Referring now to the drawings, FIGURE 1 shows a circuit wherein signal voltages applied at input 1 are to be delayed relative to the output 2. The actual delay element is a capacitor 3 which is connected in series with a diode 4, the series circuit constituting capacitor 3 and diode 4 being connected between the input 1 and the output 2. A rectangular clock pulse 5 having a voltage leap from —0.5 v. to —6.75 v. is applied to the input 1 via a diode 6. The clock pulse generator is shown schematically at 5*a*.

The junction 7 of the capacitor 3 with the diode 4 is maintained constant at —0.5 v. by a potential diode 8. Connected to the input is any desired known diode network 9 whose information potential will be of either —7 v. (corresponding, for instance, to logical ONE) or —0.2 v. (corresponding to logical ZERO). In FIGURE 1, the diode network 9 is shown as comprising two junctions interconnected by OR-diodes, the network having applied to it the outputs of four flip-flops 10 which contain the intelligence to be logically connected.

Thus, upon the appearance of a clock pulse at the anode of diode 6 the input 1 of the delay circuit according to the present invention will be either at —0.2 v. or at —7 v.; in the first case, no pulse will reach the output 2 inasmuch as the diode 6 is non-conductive for both clock pulse potentials and the charge state of the capacitor 3 cannot be changed. In the second case, however, i.e., when the —7 v. potential is applied to the input 1, the capacitor 3 is charged during the negative clock pulse interval, the charging current flowing from input 1 via diode 8 to the fixed potential of —0.5 v. The diode 6 becomes conductive during the trailing flank of the negative going clock pulse and a discharge current flows through the capacitor 3. The diode 4 does not conduct current flowing in this direction, so that throughout the duration of the clock pulse the flip-flop 11, which is connected to the output 2 and which serves as memory element, is not affected. The trailing flank of the clock pulse 5 initiates the discharge; the charge on the left-hand capacitor plate of capacitor 3, as viewed in the drawing, leaks off via the clock pulse generator, whereas the charge on the right-hand plate flows to the base of a transistor 14, forming part of the output memory element 11, via the diode 4 which is conductive for current flowing in such direction.

Thus, the circuit according to the present invention possesses two important characteristics:

(a) The input information is transferred to the output exactly in synchronism with the trailing flank of the clock pulse, the output, however, not being influenced during the remainder of the time.

(b) The clock pulse is always applied to the circuit, and thus contains no information, whereas the information itself need not arrive in exact synchronism with the clock pulse. As a result, the design of the diode network 9 which is used with the circuit according to the present invention can vary within wide limits.

Figure 2:
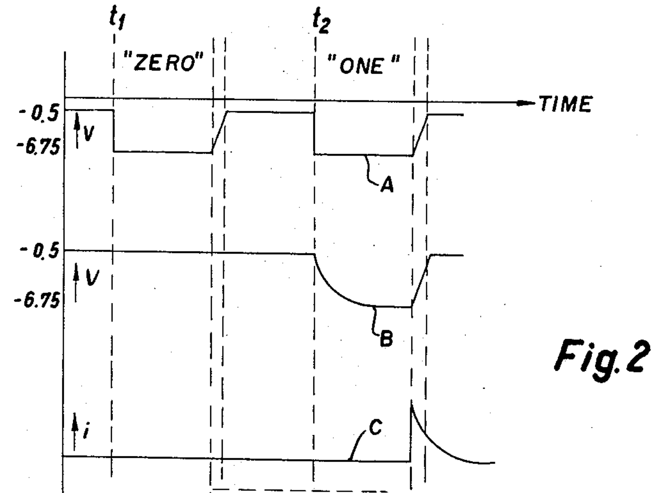
FIGURE 2 shows various voltage and current curves.

FIGURE 2 shows various voltages and currents as a function of time. The clock pulse 5 is applied periodically as represented by curve A. Let it be assumed that at the instant of interrogation $t_1$ the input 1 is at a potential of —0.5 v., representing a binary ZERO, whereas at the instant of interrogation $t_2$ the input 1 is at a potential of —6.75 v., representing binary ONE. The voltage B at the input 1 is shown below the timing pulse, the exponential decay being due to the charging of the capacitor 3 through the input source at 1. Also shown is the output current C at output 2, which current flows upon discharge of the capacitor 3 and brings about the change of state of the memory element 11, e.g., by blocking transistor 14.

Figure 3:
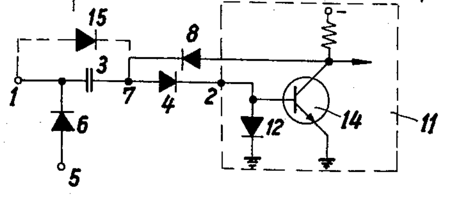
FIGURE 3 is another embodiment of a circuit according to the instant invention.

FIGURE 3 shows a modification of the circuit of FIGURE 1, with like reference numerals showing like parts. In this embodiment, the potential diode 8 is not connected to a fixed potential of —0.5 v. but to the collector of a transistor 14 forming part of the flip-flop memory element 11. The voltage at this collector is either —0.2 v., when the transistor is conductive, or —7 v., when the transistor is non-conductive. It is advantageous if the base voltage, and therefore also the potential at point 7 of the delay line circuit, is limited, in positive direction, by means of a diode 12. It is assumed, for the time being, that the diode 15, shown in dotted lines, is omitted. In the first case, when the diode 8 is at —0.2 v., nothing changes insofar as the operation of the circuit is concerned, i.e., the base of the transistor 14 is controlled after a clock pulse and the input information pulse have been applied.

If, however, the diode 8 is at —7 v., the capacitor 3 cannot be charged and the flip-flop 11 cannot be controlled. Inasmuch as the controlling of the flip-flop 11 is thus dependent on the intelligence contents, this circuit is particularly well suited for a double controlling, e.g., for change-over flip-flops in counter chains.

In case diodes having larger tolerance ranges are to be used in the last-described circuit arrangement, it is possible, under certain circumstances, that the differences of the blocking voltage values of the individual diodes that are actually used may prevent the potential of the connection point 7 of the series circuit in the delay line, at relatively negative collector potential (when the transistor is non-conductive) from assuming a definite value. In that case, there would be no control of the transistor 14 due to changes in charge on the capacitor, because the potential of point 7 would adjust itself to approximately 0 v., for the reason that the diode 8 would remain non-conductive and thus prevent the capacitor from being charged. This, however, presupposes that the diode 8 has a high backward resistance as compared to that of the diode 4. But if the diode 8 has a relatively small backward resistance and consequently behaves as a high-ohmic resistance, it transfers the negative collector potential of —7 v. of the non-conductive transistor to the point 7 of the series circuit composed of capacitor 3 and diode 4. In that case, the charge on the capacitor can be changed by the clock pulse 5 if the input intelligence ONE (—7 v.) is applied. It is true that this pulse does not reach the base of transistor 14, but this charging and discharging of the capacitor is an unnecessary burden on the input circuit 9 and the clock pulse generator. In order to prevent this, the present invention provides the above-mentioned diode 15 which is connected in parallel with the capacitor 3 and has its cathode connected to point 7. This diode 15 gives the point 7 a definite potential, in this case, of about —0.2 v., if the input intelligence signal ZERO (—0.2 v.) is to be transferred via the diode network to point 1, or if the input intelligence signal ONE (—7 v.) is to be transferred and the clock pulse has not yet occurred. When in the latter case the clock pulse is applied, the same can effect a change of charge of the capacitor only when the transistor 14 is, at that time, conductive, this conductivity of the transistor 14 being independent of the backward resistances of the diode 8. If the transistor is non-conductive and the backward resistance of diode 8 is low-ohmic, there will no longer occur any change of charge of the capacitor, because the point 7, prior to the start of the clock pulse, is maintained, by diode 15, at a potential of about —0.2 v., and, in case the collector potential of the non-conductive transistor is selected to be not less than the negative amplitude of the clock pulse, no charging current for charging the capacitor 3 can flow through diode 8 during the negative clock pulse interval.

Figure 4:
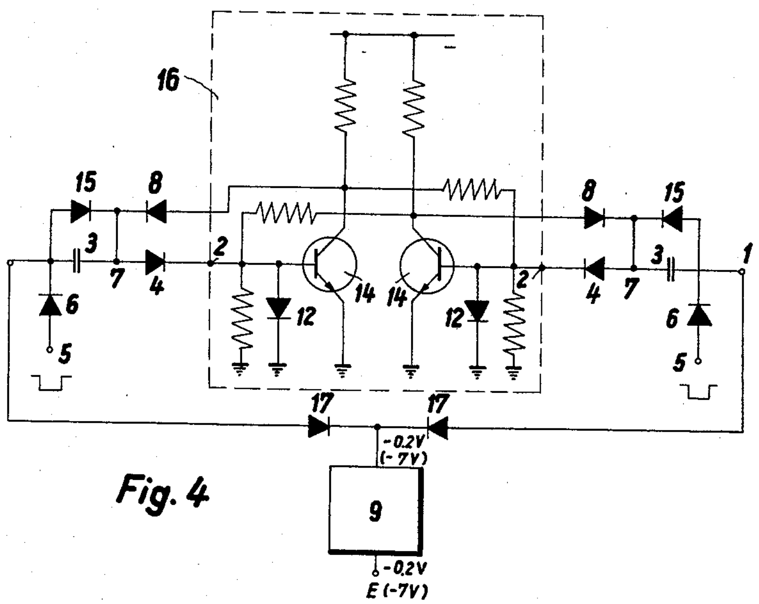
FIGURE 4 shows the use of the circuit of FIGURE 3 in conjunction with a bistable stage in the form of a change-over flip-flop.

FIGURE 4 shows an example of how the present invention may be used in the operation of a bistable stage 16 designed as a change-over flip-flop (for example, in counting chains). For this purpose, the two delay lines which are shown and which, together with the bistable stage 16, make possible the operation thereof as a change-over flip-flop because the latter is controlled from two inputs, are connected, via disjunctive diodes 17, with the conventional diode network 9 and are actuated by the same clock pulse generator.

Both transistors 14 of the bistable stage 16 are actuated, via a respective delay arrangement, by the clock pulse generator, and the diode network 9. Without the diodes 15 the diode network and the clock pulse generator would, for the above-mentioned reasons, be burdened not only by the charging current of the capacitor which pertains to the particular transistor which is conductive and is thus to be switched over, but additionally by the charging current of the capacitor pertaining to the other transistor which is already non-conductive, so that the total load on the diode network 9 is twice as great as necessary.

The static relationships, which otherwise are critical in the operation of a bistable stage provided with alternate controls, become unambiguous in the circuit according to the instant invention because only one input is controlled at any one time.

The present invention is not limited to the illustrated embodiments, particularly insofar as the specific values for voltages and the polarity of voltages and currents are concerned. Furthermore, the diode network 9 is not limited to the particular arrangement shown. In particular, it may often be that but a single AND-circuit is used, whereupon the disjunctive diodes 13 may be omitted.

It will be understood that the above description of the present invention is susceptible to various modifications, changes, and adaptations, and the same are intended to be comprehended within the meaning and range of equivalents of the appended claims.

What is claimed is:

1. A delay line comprising, in combination: an input; a capacitor having one terminal connected to said input; a first diode having one terminal connected to the other terminal of said capacitor; an output connected to the other terminal of said first diode; a second diode having one terminal connected to said one terminal of said capacitor; means for applying clock pulses to the other terminal of said second diode; a third diode having one terminal connected to said other terminal of said capacitor; and means connected to the other terminal of said third diode and applying a potential to the junction of said capacitor and said first diode, via said third diode, for charging said capacitor, upon the application of an input signal to said input, during the clock pulse interval and discharging said capacitor, via said output, during the trailing flank of a clock pulse; the polarity of said second diode being so arranged that, in the absence of a clock pulse, it is conductive and hence able to pass the input signal appearing at said input and is rendered non-conductive only upon the application of a clock pulse so that there can then be formed at said input an input voltage which corresponds to said input signal; the polarity of said third diode being so arranged that, during the clock pulse, the charging current for said capacitor can flow through said third diode; and the polarity of said first diode being so arranged that, during the trailing flank of the clock pulse, the discharge current for said capacitor can flow through said first diode to said output.

2. A circuit arrangement for the delayed transmission of binary coded intelligence by changing the charge of a capacitor wherein the change of charge on said capacitor is dependent on a clock pulse, said circuit arrangement having an input and an output and comprising, in combination: a series circuit connected between said input and said output and composed of a delay capacitor and a first diode; means for applying a clock pulse to said input via a second diode; and means applying a potential to the junction of said capacitor and said first diode, via a third diode, for charging said capacitor, upon the application of an input signal to the input, during the clock pulse interval and discharging said capacitor, via the output, during the trailing flank of a clock pulse; the polarity of said second diode being so arranged that, in the absence of a clock pulse, it is conductive and hence able to pass the input signal appearing at the input and is rendered non-conductive only upon the application of a clock pulse so that there can then be formed at the input an input voltage which corresponds to said input signal; the polarity of said third diode being so arranged that, during the clock pulse, the charging current for said capacitor can flow through said third diode; and the polarity of said first diode being so arranged that, during the trailing flank of the clock pulse, the discharge current for said capacitor can flow through said first diode to the output.

3. A circuit arrangement as defined in claim 2 wherein said potential applying means comprise a bistable stage incorporating a transistor whose collector is connected to said third diode and whose base is controlled by said output.

4. A circuit arrangement as defined in claim 3, further comprising a fourth diode connected in parallel with said capacitor, the cathode of said fourth diode being connected to said junction of said capacitor and said first diode.

References Cited by the Examiner

UNITED STATES PATENTS

| | | | |
|---|---|---|---|
| 2,870,347 | 1/59 | Jensen | 340—173 X |
| 2,890,439 | 6/59 | Bird | 340—173 |

BERNARD KONICK, *Acting Primary Examiner.*

IRVING L. SRAGOW, *Examiner.*